US012431483B2

(12) United States Patent
Choi et al.

(10) Patent No.: US 12,431,483 B2
(45) Date of Patent: Sep. 30, 2025

(54) METHOD FOR MANUFACTURING NEGATIVE ELECTRODE, NEGATIVE ELECTRODE OBTAINED THEREFROM AND SECONDARY BATTERY INCLUDING THE SAME

(71) Applicant: LG ENERGY SOLUTION, LTD., Seoul (KR)

(72) Inventors: Hee-Won Choi, Daejeon (KR); Tae-Gyun Noh, Daejeon (KR); Mi-Ru Jo, Daejeon (KR); Chan-Ki Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 709 days.

(21) Appl. No.: 17/772,260

(22) PCT Filed: Nov. 17, 2020

(86) PCT No.: PCT/KR2020/016198
§ 371 (c)(1),
(2) Date: Apr. 27, 2022

(87) PCT Pub. No.: WO2021/101219
PCT Pub. Date: May 27, 2021

(65) Prior Publication Data
US 2022/0407048 A1    Dec. 22, 2022

(30) Foreign Application Priority Data

Nov. 18, 2019    (KR) .................. 10-2019-0148063

(51) Int. Cl.
| | |
|---|---|
| *H01M 4/1393* | (2010.01) |
| *H01M 4/04* | (2006.01) |
| *H01M 4/133* | (2010.01) |
| *H01M 4/525* | (2010.01) |
| *H01M 4/587* | (2010.01) |
| *H01M 50/105* | (2021.01) |
| *H01M 4/02* | (2006.01) |
| *H01M 4/62* | (2006.01) |
| *H01M 10/0525* | (2010.01) |

(52) U.S. Cl.
CPC ....... *H01M 4/1393* (2013.01); *H01M 4/0404* (2013.01); *H01M 4/0435* (2013.01); *H01M 4/133* (2013.01); *H01M 4/525* (2013.01); *H01M 4/587* (2013.01); *H01M 50/105* (2021.01); *H01M 2004/021* (2013.01); *H01M 2004/027* (2013.01); *H01M 4/622* (2013.01); *H01M 4/624* (2013.01); *H01M 10/0525* (2013.01)

(58) Field of Classification Search
CPC .. H01M 4/0404; H01M 4/0435; H01M 4/133; H01M 4/1393; H01M 2004/021; H01M 2004/027
See application file for complete search history.

(56) References Cited

U.S. PATENT DOCUMENTS

| | | |
|---|---|---|
| 8,974,968 B2 | 3/2015 | Okanishi et al. |
| 9,627,682 B2 | 4/2017 | Satow et al. |
| 2002/0015888 A1 | 2/2002 | Omaru et al. |
| 2009/0214954 A1 | 8/2009 | Onishi et al. |
| 2012/0062393 A1 | 3/2012 | Kameda et al. |
| 2012/0183846 A1 | 7/2012 | Abe |
| 2017/0187041 A1 | 6/2017 | Yamada et al. |
| 2019/0237763 A1 | 8/2019 | Wakizaka et al. |
| 2019/0305308 A1 | 10/2019 | Lee et al. |
| 2020/0385875 A1 | 12/2020 | Schmid et al. |
| 2021/0171353 A1 | 6/2021 | Gulas et al. |

FOREIGN PATENT DOCUMENTS

| | | |
|---|---|---|
| CN | 102362381 A | 2/2012 |
| CN | 106663808 A | 5/2017 |
| EP | 2 280 437 A1 | 2/2011 |
| EP | 3 168 909 A1 | 5/2017 |
| EP | 3 893 297 A1 | 10/2021 |
| JP | 9-293507 A | 11/1997 |
| JP | 2001-332263 A | 11/2001 |
| JP | 2013-196842 A | 9/2013 |
| JP | 2014-60168 A | 4/2014 |
| JP | 6472933 B2 | 2/2019 |
| KR | 10-0884431 B1 | 2/2009 |
| KR | 10-2009-0111129 A | 10/2009 |
| KR | 10-2011-0033134 A | 3/2011 |
| KR | 10-1106966 B1 | 1/2012 |
| KR | 10-2012-0098609 A | 9/2012 |

(Continued)

OTHER PUBLICATIONS

Extended European Search Report for European Application No. 20891357.4, dated Nov. 28, 2022.

(Continued)

*Primary Examiner* — Laura Weiner
(74) *Attorney, Agent, or Firm* — Birch, Stewart, Kolasch & Birch, LLP

(57) ABSTRACT

A method for manufacturing a negative electrode, including the steps of preparing a negative electrode slurry including low-expansion natural graphite, a binder polymer, a conductive material and a dispersion medium; applying the negative electrode slurry to at least one surface of a negative electrode current collector, drying the coated negative electrode slurry, to form a preliminary negative electrode having a preliminary negative electrode active material layer; and pressing the preliminary negative electrode to obtain the negative electrode having a finished negative electrode active material layer. A difference between the specific surface area of the preliminary negative electrode active material layer before pressing and that of the finished negative electrode active material layer after pressing is 0.5 m²/g to 1.0 m²/g. A negative electrode obtained by the method and a secondary battery including the negative electrode are also disclosed.

10 Claims, No Drawings

(56) References Cited

FOREIGN PATENT DOCUMENTS

| KR | 10-2017-0002302 A | 1/2017 |
| KR | 10-2018-0035693 A | 4/2018 |
| KR | 10-2018-0118602 A | 10/2018 |
| KR | 10-2019-0108883 A | 9/2019 |
| WO | 2008/146995 A1 | 12/2008 |
| WO | 2014/103281 A1 | 7/2014 |
| WO | WO 2020/159322 * | 8/2020 |

OTHER PUBLICATIONS

International Search Report for PCT/KR2020/016198 mailed on Feb. 26, 2021.

* cited by examiner

METHOD FOR MANUFACTURING NEGATIVE ELECTRODE, NEGATIVE ELECTRODE OBTAINED THEREFROM AND SECONDARY BATTERY INCLUDING THE SAME

TECHNICAL FIELD

The present disclosure relates to a method for manufacturing a negative electrode, a negative electrode obtained therefrom, and a secondary battery including the same. Particularly, the present disclosure relates to a method for manufacturing a negative electrode having improved capacity and cycle characteristics, a negative electrode obtained therefrom, and a secondary battery including the same.

The present application claims priority to Korean Patent Application No. 10-2019-0148063 filed on Nov. 18, 2019 in the Republic of Korea, the disclosures of which are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and a battery in order to improve the capacity density and specific energy in developing such batteries.

Among the commercially available secondary batteries, lithium secondary batteries developed in the early 1990's have been spotlighted, since they have a higher operating voltage and significantly higher energy density, long cycle life and a low self-discharge rate, as compared to conventional batteries, such as Ni-MH, Ni—Cd and sulfuric acid-lead batteries using an aqueous electrolyte.

Particularly, as the markets of electric vehicles, robots and electric power storage systems have been developed rapidly, there is a need for secondary batteries having high energy density, stability, a compact size, a low weight and long service life.

Currently, graphite has been used widely as a negative electrode active material of a secondary battery. Particularly, when using natural graphite instead of artificial graphite, the cost required for a raw material of a negative electrode can be reduced to less than half. However, a secondary battery using the conventional natural graphite for the negative electrode shows the problems related with cycle and swelling characteristics due to a large specific surface area and pores in the active material.

DISCLOSURE

Technical Problem

The present disclosure is designed to solve the problems of the related art, and therefore the present disclosure is directed to providing a method for manufacturing a negative electrode capable of improving the capacity, cycle characteristics and rapid charge characteristics of a secondary battery.

The present disclosure is also directed to providing a negative electrode obtained by the method.

In addition, the present disclosure is directed to providing a secondary battery including the negative electrode.

Technical Solution

In one aspect of the present disclosure, there is provided a method for manufacturing a negative electrode according to any one of the following embodiments.

According to the first embodiment, there is provided a method for manufacturing a negative electrode, including the steps of:

preparing a negative electrode slurry including low-expansion natural graphite, a binder polymer, a conductive material and a dispersion medium;

applying the negative electrode slurry to at least one surface of a negative electrode current collector, drying the coated negative electrode slurry, to form a preliminary negative electrode having a preliminary negative electrode active material layer; and pressing the preliminary negative electrode to obtain a negative electrode having a finished negative electrode active material layer, wherein the difference between the specific surface area of the preliminary negative electrode active material layer before pressing and that of the finished negative electrode active material layer after pressing is 0.5 $m^2/g$ to 1.0 $m^2/g$, the low-expansion natural graphite has a difference in particle size between $D_{90}$ and $D_{10}$ of 10 μm or less, wherein $D_{90}$ is a particle diameter at a point of 90% in the particle size cumulative distribution as a function of particle diameter in a laser diffraction particle size analyzer, and $D_{10}$ is a particle diameter at a point of 10% in the particle size cumulative distribution as a function of particle diameter in the laser diffraction particle size analyzer, and the low-expansion natural graphite has a total pore volume of 10 $cm^3/g$ to 20 $cm^3/g$.

According to the second embodiment, there is provided the method for manufacturing a negative electrode as defined in the first embodiment, wherein the difference between the specific surface area of the preliminary negative electrode active material layer before pressing and that of the finished negative electrode active material layer after pressing is 0.6 $m^2/g$ to 0.9 $m^2/g$.

According to the third embodiment, there is provided the method for manufacturing a negative electrode as defined in the first or the second embodiment, wherein the low-expansion natural graphite has a difference in particle size between $D_{90}$ and $D_{10}$ of 5 μm to 10 μm.

According to the fourth embodiment, there is provided the method for manufacturing a negative electrode as defined in any one of the first to the third embodiments, wherein the low-expansion natural graphite has a total pore volume of 12 $cm^3/g$ to 18 $cm^3/g$.

According to the fifth embodiment, there is provided the method for manufacturing a negative electrode as defined in any one of the first to the fourth embodiments, wherein the difference of I004/I110 in degree of orientation between the preliminary negative electrode active material layer before pressing and the finished negative electrode active material layer after pressing is 4 to 8.

According to the sixth embodiment, there is provided the method for manufacturing a negative electrode as defined in any one of the first to the fifth embodiments, wherein the difference of I004/I110 in degree of orientation between the preliminary negative electrode active material layer before pressing and the finished negative electrode active material layer after pressing is 5 to 7.

According to the seventh embodiment, there is provided a negative electrode obtained by the method as defined in any one of the first to the sixth embodiments.

According to the eighth embodiment, there is provided a secondary battery including the negative electrode as defined in the seventh embodiment, a positive electrode and a separator interposed between the negative electrode and the positive electrode.

According to the ninth embodiment, there is provided the secondary battery as defined in the eighth embodiment, wherein the positive electrode includes a lithium cobalt oxide.

According to the tenth embodiment, there is provided the secondary battery as defined in the eighth or the ninth embodiment, which is a pouch-type secondary battery.

Advantageous Effects

According to an embodiment of the present disclosure, it is possible to provide a method for manufacturing a negative electrode, wherein low-expansion natural graphite having a controlled particle size is used as a negative electrode active material, and pressing conditions are controlled to maintain the structure, i.e. specific surface area, degree of orientation and porosity, of the initially coated negative electrode active material layer even after pressing. In this manner, the negative electrode is prevented from the problem of swelling, a lithium ion transporting path is ensured to allow rapid charging of a secondary battery, and the output characteristics and cycle characteristics of a secondary battery can be improved.

BEST MODE

Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In one aspect of the present disclosure, there is provided a method for manufacturing a negative electrode, including the steps of:
preparing negative electrode slurry including low-expansion natural graphite, a binder polymer, a conductive material and a dispersion medium;
applying the negative electrode slurry to at least one surface of a negative electrode current collector, followed by drying, to form a preliminary negative electrode having a preliminary negative electrode active material layer; and
pressing the preliminary negative electrode to obtain a negative electrode having a finished negative electrode active material layer,
wherein the difference between the specific surface area of the preliminary negative electrode active material layer before pressing and that of the finished negative electrode active material layer after pressing is 0.5-1.0 $m^2/g$,
the low-expansion natural graphite has a difference in particle size between $D_{90}$ and $D_{10}$ of 10 μm or less, wherein $D_{90}$ and $D_{10}$ mean the particle diameter at a point of 90% and 10%, respectively, in the particle size cumulative distribution as a function of particle diameter in a laser diffraction particle size analyzer, and
the low-expansion natural graphite has a total pore volume of 10-20 $cm^3/g$.

Hereinafter, each step will be explained in more detail.

First, negative electrode slurry including low-expansion natural graphite, a binder polymer, a conductive material and a dispersion medium is prepared.

The negative electrode slurry may be obtained by dispersing the negative electrode active material, the conductive material and the binder polymer in the dispersion medium. If necessary, the negative electrode slurry may further include a filler.

The low-expansion natural graphite refers to a natural graphite active material obtained by reducing pores in the active material caused by physical damages in processing to reduce side-reactions with an electrolyte, and having low volume swelling characteristics during charge/discharge.

The low-expansion natural graphite shows a difference in particle size between $D_{90}$ and $D_{10}$ of 10 μm or less. According to an embodiment of the present disclosure, the difference may be 1-10 μm, 1-8 μm, 5-10 μm, 6-9 μm, 8-10 μm, 5-8 μm, or 7-8 μm.

Herein, $D_{90}$ and $D_{10}$ mean a particle diameter at a point of 90% and 10%, respectively, in the particle number cumulative distribution depending on particle diameter in a laser diffraction particle size analyzer. Particularly, $D_{90}$ and $D_{10}$ may be obtained by dispersing powder, low-expansion natural graphite, to be determined in a dispersion medium, introducing the resultant dispersion to a commercially available laser diffraction particle size analyzer (e.g. Microtrac S3500) to determine a difference in diffraction pattern depending on particle size, when particles pass through laser beams, and then calculating particle size distribution.

The characteristic in particle size of the low-expansion natural graphite, i.e. difference between $D_{90}$ and $D_{10}$ becomes a reference capable of determining whether the low-expansion natural graphite has a broad or narrow particle size distribution. As the difference between $D_{90}$ and $D_{10}$ is decreased, the low-expansion natural graphite has a narrow particle size distribution and includes particles having a uniform particle diameter.

When the difference in particle size between $D_{90}$ and $D_{10}$ of the low-expansion natural graphite is larger than 10 μm, micropowder and macropowder are increased to cause the problem of degradation of the performance of a battery.

The low-expansion natural graphite may have a total pore volume of 10-20 $cm^3/g$. According to an embodiment of the present disclosure, the total pore volume may be 10-15 $cm^3/g$, 15-20 $cm^3/g$, 12-18 $cm^3/g$, 12-15 $cm^3/g$, 15-18 $cm^3/g$, 14-16 $cm^3/g$, 14-15 $cm^3/g$, or 15-16 $cm^3/g$.

The total volume of the low-expansion natural graphite means the sum of all pore volumes present in the whole low-expansion natural graphite. The total pore volume of the low-expansion natural graphite may be determined through BJH Plot program, while adsorbing nitrogen to the low-expansion natural graphite powder, by using BET BEL Sorption system.

According to an embodiment of the present disclosure, the negative electrode active material may further include, as a negative electrode active material, other carbonaceous materials, silicon-based materials (such as silicon oxide of SiOx (0<x<2)), Si, or the like, besides the low-expansion natural graphite.

The carbonaceous materials may include at least one selected from the group consisting of crystalline natural graphite, amorphous hard carbon, low-crystalline soft carbon, carbon black, acetylene black, Ketjen black, Super P, graphene and fibrous carbon.

According to an embodiment of the present disclosure, besides the low-expansion natural graphite, the negative electrode active material may further include a negative electrode active material selected from: metal composite oxides such as $Li_xFe_2O_3$ (0≤x≤1), $Li_xWO_2$ (0≤x≤1), $Sn_xMe_{1-x}Me'_yO_z$ (Me: Mn, Fe, Pb or Ge; Me': Al, B, P, Si, an element of Group 1, Group 2 or Group 3 in the Periodic Table, or halogen; 0≤x≤1; 1≤y≤3; 1≤z≤8); lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, or the like; conductive polymers such as polyacetylene; Li—Co—Ni based materials; titanium oxide; and lithium titanium oxide, or the like. Particularly, the negative electrode active material may further include a carbonaceous material and/or Si.

The conductive material is added generally in an amount of 1-50 wt % based on the total weight of the mixture including the negative electrode active material. Such a conductive material is not particularly limited, as long as it has conductivity, while not causing any chemical change in the corresponding battery. Particular examples of the conductive material include: graphite, such as natural graphite or artificial graphite; carbon black, such as carbon black, acetylene black, Ketjen black, channel black, furnace black, lamp black or thermal black; conductive fibers, such as carbon fibers or metallic fibers; metal powder, such as fluorocarbon, aluminum or nickel powder; conductive whiskers, such as zinc oxide or potassium titanate; conductive metal oxides, such as titanium oxide; conductive materials, such as a polyphenylene derivative; or the like.

Meanwhile, a graphitic material having elasticity may be used as a conductive material, optionally in combination with the above-mentioned materials.

The binder polymer is an ingredient which assists binding of the active material with the conductive material and binding to the current collector, and is added generally in an amount of 1-50 wt %, based on the total weight of the mixture including the negative electrode active material. Particular examples of the binder polymer include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluororubber, various copolymers, or the like.

The dispersion medium may include water, alcohols, such as ethanol, acetone, or the like.

The filler is an ingredient which inhibits swelling of the negative electrode and is used optionally. Such a filler is not particularly limited, as long as it is a fibrous material, while not causing any chemical change in the corresponding battery. Particular examples of the filler include: olefinic polymers, such as polyethylene or polypropylene; and fibrous materials, such as glass fibers or carbon fibers.

According to an embodiment of the present disclosure, the negative electrode slurry may include the binder polymer in an amount of 1-3 parts by weight, 1-2.5 parts by weight, 2-2.5 parts by weight, 1-2 parts by weight, or 1.2-1.5 parts by weight, the conductive material in an amount of 0.2-1.5 parts by weight, 0.2-1.2 parts by weight, 0.2-1 parts by weigh, or 0.4-0.8 parts by weight, and the dispersion medium in an amount of 0.5-1.5 parts by weight, or 0.8-1.2 parts by weight, based on 100 parts by weight of the low-expansion natural graphite.

Next, the negative electrode slurry is applied to at least one surface of a negative electrode current collector, followed by drying, to form a preliminary negative electrode including a preliminary negative electrode active material layer.

The negative electrode current collector is not particularly limited, as long as it has conductivity, while not causing any chemical change in the corresponding battery. Particular examples of the negative electrode current collector include copper, stainless steel, aluminum, nickel, titanium, baked carbon, copper or stainless steel surface-treated with carbon, nickel, titanium, silver, etc., aluminum-cadmium alloy, or the like. In addition, similarly to the positive electrode current collector, fine surface irregularities may be formed on the surface of the negative electrode current collector to reinforce the binding force to the negative electrode active material. The negative electrode current collector may be used in various shapes, including a film, sheet, foil, net, porous body, foamed body, non-woven web, or the like.

In general, the negative electrode current collector generally has a thickness of 3-500 µm.

The negative electrode slurry is applied to and dried on at least one surface of the negative electrode current collector, wherein the application and drying methods are not particularly limited, as long as they are used conventionally in the art.

According to an embodiment of the present disclosure, the negative electrode slurry may be applied through a coating process using a slot die. In addition to this, Mayer bar coating, gravure coating, dip coating, spray coating, or the like, may be used.

In addition, the drying may be carried out by a process, such as heating or hot air injection, at a temperature, where water contained in the negative electrode can be removed to the highest degree along with solvent evaporation and the binding force of the binder polymer can be increased. Particularly, the drying process may be carried out at a temperature equal to or higher than the boiling point of the solvent and equal to or lower than the melting point of the binder polymer. More particularly, the drying process may be carried out at 50-150° C., 70-150° C., 100-150° C., 70-120° C., or 100-120° C., for 1-50 hours.

Then, the preliminary negative electrode is pressed to obtain a negative electrode including a finished negative electrode active material layer. According to an embodiment of the present disclosure, the preliminary negative electrode is pressed by using a pressing instrument, such as a roll press, under a linear pressure condition applied to a target thickness and target porosity, and then vacuum-dried to obtain a negative electrode including a finished negative electrode active material layer formed on a current collector. According to an embodiment of the present disclosure, the target thickness may be 50-100 µm, 50-80 µm, 80-100 µm, or 75-85 µm, and the target porosity may be 20-30%, 25-30%, or 20-25%. In addition, the vacuum drying may be carried out at 100-150° C., 100-130° C., or 130-150° C., for 1-15 hours, 1-8 hours, or 8-15 hours.

The difference between the specific surface area of the preliminary negative electrode active material layer before pressing and that of the finished negative electrode active material layer after pressing is 0.5-1.0 m²/g. According to an embodiment of the present disclosure, the difference in specific surface area may be 0.5-0.8 m²/g, 0.8-1.0 m²/g, 0.6-0.9 m²/g, 0.6-0.8 m²/g, 0.8-0.9 m²/g, or 0.7-0.8 m²/g.

The specific surface area may be determined by allowing the active material to adsorb nitrogen gas by using BET BEL Sorption system.

In addition, the difference between the degree of orientation of the preliminary negative electrode active material layer before pressing and that of the finished negative electrode active material layer after pressing is 4-8. According to an embodiment of the present disclosure, the difference in degree of orientation may be 4-6, 6-8, 5-7, 5-6, 6-7, or 5.5-6.5.

The degree of orientation (I004/I110) of the negative electrode active material layer refers to a peak intensity ratio (I004/I110) of (004) surface and (110) surface as determined by electrode state X-ray diffractometry, and the peak intensity ratio may be obtained by X-ray diffractometry. The electrode state X-ray diffractometry refers to X-ray diffractometry carried out after forming the composite particles into an electrode (negative electrode) state. The X-ray diffractometry may be carried out by using X-ray diffractometer, Bruker $D_4$ Endeavor, with Cu-Kα rays, and the measured values may be corrected through Topas3 fitting program.

In another aspect of the present disclosure, there is provided a negative electrode obtained by the above-described method for manufacturing a negative electrode.

In still another aspect of the present disclosure, there is provided a secondary battery obtained by forming an electrode assembly by using the negative electrode obtained by the above-described method, a positive electrode including a positive electrode active material and a separator, and introducing the electrode assembly and an electrolyte to a battery casing.

Particular examples of the positive electrode active material may include, but are not limited to: layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ or $Cu_2V_2O_7$; lithium nickel oxides represented by the chemical formula of $LiNi_{1-y}M_yO_2$ (wherein M is Co, Mn, Al, Cu, Fe, Mg, B or Ga, and y is 0.01-0.3); ternary lithium manganese composite oxides represented by the chemical formula of $LiMn_{2-y}M_yO_2$ (wherein M is Co, Ni, Fe, Cr, Zn or Ta, and y is 0.01-0.1), or $Li_2Mn_3MO_8$ (wherein M is Fe, Co, Ni, Cu or Zn); $LiMn_2O_4$ in which Li is partially substituted with an alkaline earth metal ion; disulfide compounds; $Fe_2(MoO_4)_3$; ternary lithium transition metal composite oxides, such as $Li(Ni_aCo_bMn_c)O_2$ (0<a<1, 0<b<1, 0<c<1, a+b+c=1); or the like.

According to an embodiment of the present disclosure, the positive electrode active material may include a lithium cobalt oxide, including $LiCoO_2$, or the like. When using such a lithium cobalt oxide as a positive electrode active material, it is possible to inhibit dissolution of the other metals, such as nickel and manganese, on the surface of the negative electrode.

The positive electrode active material may be dispersed in a solvent together with a binder polymer, a conductive material and other additives to form positive electrode mixture slurry. Then, the positive electrode mixture slurry may be coated on at least one surface of a positive electrode current collector, followed by drying and pressing, to form a positive electrode.

Non-limiting examples of the positive electrode current collector include foil made of aluminum, nickel or a combination thereof, or the like, and non-limiting examples of the negative electrode current collector include foil made of copper, gold, nickel, copper alloy or a combination thereof, or the like.

The binder polymer, the conductive material and other additives used in the positive electrode may be the same as or different from those used in the negative electrode. Reference will be made to the above description about the binder polymer and the conductive material related with the negative electrode.

The separator is interposed between the positive electrode and the negative electrode, and an insulating thin film having high ion permeability and mechanical strength is used as the separator. The separator generally has a pore diameter of 0.01-10 μm and a thickness of 5-300 μm. The separator may include a porous polymer substrate, such as a porous polymer film substrate or porous polymer non-woven web substrate, alone, or may further include a porous coating layer disposed on at least one surface of the porous polymer substrate and containing inorganic particles and a binder polymer. The porous polymer film substrate may be a porous polymer film made of polyolefin, such as polyethylene or polypropylene. In addition to polyolefin, the porous polymer film substrate may be made of a polymer including polyethylene terephthalate, polybutylene terephthalate, polyester, polyacetal, polyamide, polycarbonate, polyimide, polyetherether ketone, polyether sulfone, polyphenylene oxide, polyphenylene sulfide, polyethylene naphthalene, or the like, alone or in combination.

Non-limiting examples of the binder polymer include but are not limited to: polyvinylidene fluoride, polyvinylidene fluoride-co-hexafluoropropylene, polyvinylidene fluoride-co-trichloro ethylene, polymethyl methacrylate, polybutyl acrylate, polybutyl methacrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinylalchol, cyanoethyl cellulose, cyanoethyl sucrose, pullulan, carboxymethyl cellulose, or the like.

According to an embodiment of the present disclosure, the binder polymer may be classified into a dispersant binder polymer also functioning as a dispersant, and a non-dispersant binder polymer. The dispersant binder polymer is a polymer having at least one dispersion-contributing functional group in the backbone or sidechain of the polymer, and the dispersion-contributing functional group includes an OH group, CN group, or the like. Particular examples of the dispersant binder polymer include cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, or the like. Particular examples of the non-dispersant binder polymer include the above-listed binder polymers, except the examples of the dispersant binder polymer.

For example, the weight ratio of the inorganic particles to the total weight of the binder polymer and the crosslinked polymer may be 50:50-99:1, particularly 70:30-95:5. When the weight ratio of the inorganic particles to the total weight of the binder polymer and the crosslinked polymer satisfies the above-defined range, it is possible to prevent the problem of a decrease in pore size and porosity of the resultant coating layer, caused by an increase in content of the binder polymer and the crosslinked polymer. It is also possible to solve the problem of degradation of peeling resistance of the resultant coating layer, caused by a decrease in content of the binder polymer and the crosslinked polymer Non-limiting examples of the inorganic particles include inorganic particles having a dielectric constant of 5 or more, particularly 10 or more, inorganic particles having lithium ion transportability, or a mixture thereof.

Non-limiting examples of the inorganic particles having a dielectric constant of 5 or more may include $BaTiO_3$, $Pb(Zr,Ti)O_3$ (PZT), $Pb_{1-x}La_xZr_{1-y}Ti_yO_3$ (PLZT), $Pb(Mg_{1/3}Nb_{2/3})O_3PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, SiC, AlO(OH), $Al_2O_3$—$H_2O$, or a mixture thereof.

As used herein, the term 'inorganic particles having lithium ion transportability' refers to inorganic particles which contain lithium elements and do not store lithium but transport lithium ions. Non-limiting examples of the inorganic particles having lithium ion transportability include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$-based glass ($1<x<4$, $0<y<13$), such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), such as $Li_{3.25}Ge_{0.25}P_{0.75}S_4$, lithium nitride ($Li_xN_y$, $0<x<4$, $0<y<2$), such as $Li_3N$, $SiS_2$-based glass ($Li_xSi_yS_z$, $0<x<3$, $0<y<2$, $0<z<4$), such as $Li_3PO_4$—$Li_2S$—$SiS_2$, and $P_2S_5$-based glass ($Li_xP_yS_z$, $0<x<3$, $0<y<3$, $0<z<7$), such as $LiI$—$Li_2S$—$P_2S_5$, or a mixture thereof.

Although there is no particular limitation in the thickness of the porous coating layer, the thickness may be 1-10 μm, or 1.5-6 μm. Also, the porosity of the porous separator is not particularly limited, but it may be 35-65%.

The electrolyte includes conventional electrolyte ingredients, such as an organic solvent and an electrolyte salt. The electrolyte salt that may be used is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof. Particularly, a lithium salt is preferred. For example, $LiClO_4$, $LiCF_3SO_3$, $LiPF_6$, $LiAsF_6$, $LiN(CF_3SO_2)_2$ or a mixture thereof may be used.

The organic solvent used for the electrolyte may include a solvent generally known to those skilled in the art, such as a cyclic carbonate solvent containing a halogen substituent or not; a linear carbonate solvent; an ester solvent, nitrile solvent, phosphate solvent, or a mixture thereof. Particular examples of the solvent that may be used include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (GBL), flouoroethylene carbonate (FEC), methyl formate, ethyl formate, propyl formate, methyl acetate, ethyl acetate, propyl acetate, pentyl acetate, methyl propionate, ethyl propionate, propyl propionate, butyl propionate, or a mixture thereof.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

There is no particular limitation in the appearance or casing of the lithium secondary battery according to an embodiment of the present disclosure. For example, the lithium secondary battery may have a cylindrical shape using a can, a prismatic shape, a pouch-like shape or a coin-like shape. According to an embodiment of the present disclosure, the secondary battery may be a pouch-type battery.

In addition, the lithium secondary battery according to an embodiment of the present disclosure may include any conventional lithium secondary batteries, such as lithium metal secondary batteries, lithium ion secondary batteries, lithium polymer secondary batteries or lithium ion polymer secondary batteries.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

<Manufacture of Negative Electrode>

Low-expansion natural graphite, Super C65 as a conductive material, styrene butadiene rubber (SBR) as a binder polymer and carboxymethyl cellulose (CMC) as a thickener were mixed at a weight ratio of 96:1:2:1, and water was added thereto to prepare negative electrode slurry. Herein, the particle size ($D_{90}$-$D_{10}$) and total pore volume of the low-expansion natural graphite are shown in the following Table 1.

The negative electrode slurry was applied to one surface of a copper foil (current collector) at a loading amount of 3.6 mAh/cm$^2$, and vacuum dried at 70° C. for 1 hour to obtain a preliminary negative electrode including a preliminary negative electrode active material layer.

Then, the preliminary negative electrode was pressed by using a roll press under a linear pressure condition applied to a target thickness of 80 μm and target porosity of 25%, and vacuum dried at 130° C. for 8 hours to obtain a negative electrode including a finished negative electrode active material layer formed on the current collector.

The specific surface area and degree of orientation of each of the preliminary negative electrode active material layer and the finished negative electrode active material layer were measured. The difference in each of specific surface area and degree of orientation between before pressing and after pressing is shown in the following Table 1. The method for determining each difference will be explained hereinafter.

<Manufacture of Positive Electrode>

First, a lithium cobalt oxide, $LiCoO_2$, as a positive electrode active material, carbon black as a conductive material and polyvinylidene fluoride as a binder polymer were added to N-methyl pyrrolidone (NMP) as a solvent at a weight ratio of 96:2:2 to prepare positive electrode slurry. The slurry was coated on one surface of an aluminum current collector having a thickness of 15 μm, and drying and pressing were carried out under the same conditions as the negative electrode to obtain a positive electrode. Herein, the loading amount on the positive electrode active material layer was 20 mg/cm$^2$ on the dry weight basis.

<Manufacture of Pouch-Type Secondary Battery>

$LiPF_6$ was added to a solvent for non-aqueous electrolyte including ethylene carbonate mixed with ethyl methyl carbonate at a volume ratio of 3:7 at a concentration of 1 M to prepare a non-aqueous electrolyte.

A polyolefin separator was interposed between the positive electrode and the negative electrode obtained as described above, the resultant structure was introduced to a pouch-type casing, and the electrolyte was injected thereto to obtain a pouch-type secondary battery.

<Manufacture of Coin-Type Half-Cell>

The negative electrode obtained as described above and Li metal as a counter electrode were used, and a polyolefin separator was interposed between the negative electrode and Li metal to obtain an electrode assembly.

Then, $LiPF_6$ was added to a solvent for non-aqueous electrolyte including ethylene carbonate mixed with ethyl methyl carbonate at a volume ratio of 3:7 at a concentration of 1 M to prepare a non-aqueous electrolyte. The non-aqueous electrolyte was injected to the electrode assembly to obtain a coin-type half-cell.

Comparative Example 1

A negative electrode and a secondary battery including the same were obtained in the same manner as Example 1, except that low-expansion natural graphite satisfying the particle size ($D_{90}$-$D_{10}$) and total pore volume of low-expansion natural graphite as shown in the following Table 1 was used.

Comparative Example 2

A negative electrode and a secondary battery including the same were obtained in the same manner as Example 1, except that low-expansion natural graphite satisfying the particle size ($D_{90}$-$D_{10}$) and total pore volume of low-expansion natural graphite as shown in the following Table 1 was used.

Comparative Example 3

A negative electrode and a secondary battery including the same were obtained in the same manner as Example 1, except that low-expansion natural graphite satisfying the particle size ($D_{90}$-$D_{10}$) and total pore volume of low-expansion natural graphite as shown in the following Table 1 was used.

Comparative Example 4

A negative electrode and a secondary battery including the same were obtained in the same manner as Example 1, except that low-expansion natural graphite satisfying the particle size ($D_{90}$-$D_{10}$) and total pore volume of low-expansion natural graphite as shown in the following Table 1 was used.

Comparative Example 5

A negative electrode and a secondary battery including the same were obtained in the same manner as Example 1, except that low-expansion natural graphite satisfying the particle size ($D_{90}$-$D_{10}$) and total pore volume of low-expansion natural graphite as shown in the following Table 1 was used.

Comparative Example 6

A negative electrode and a secondary battery including the same were obtained in the same manner as Example 1, except that low-expansion natural graphite satisfying the particle size ($D_{90}$-$D_{10}$) and total pore volume of low-expansion natural graphite as shown in the following Table 1 was used.

Comparative Example 7

A negative electrode and a secondary battery including the same were obtained in the same manner as Example 1, except that low-expansion natural graphite satisfying the particle size ($D_{90}$-$D_{10}$) and total pore volume of low-expansion natural graphite as shown in the following Table 1 was used.

Comparative Example 8

A negative electrode and a secondary battery including the same were obtained in the same manner as Example 1, except that low-expansion natural graphite satisfying the particle size ($D_{90}$-$D_{10}$) and total pore volume of low-expansion natural graphite as shown in the following Table 1 was used.

Comparative Example 9

A negative electrode and a secondary battery including the same were obtained in the same manner as Example 1, except that low-expansion natural graphite satisfying the particle size ($D_{90}$-$D_{10}$) and total pore volume of low-expansion natural graphite as shown in the following Table 1 was used.

<Determination of Particle Size $D_{90}$ and $D_{10}$ of Low-Expansion Graphite>

Powder to be determined was dispersed in a dispersion medium and introduced to a commercially available laser diffraction particle size analyzer (e.g. Microtrac S3500) to determine a difference in diffraction pattern depending on particle size, when particles pass through laser beams, and then particle size distribution was calculated. Then, $D_{10}$ and $D_{90}$ were determined by calculating a particle diameter at a point of 10% and 90%, respectively, in the particle number cumulative distribution depending on particle diameter in the laser diffraction particle size analyzer.

<Determination of Total Pore Volume of Low-Expansion Graphite>

First, the specific surface area of low-expansion graphite was determined, and the result was fitted through BJH Plot program to calculate the total pore volume of the sum of micropores, mesopores and macropores.

Herein, the specific surface area of low-expansion graphite was determined by the BET method, particularly by using BELSORP-mino II available from BEL Japan Co. from nitrogen gas adsorption amount at a temperature (77° K) of liquid nitrogen.

<Determination of Specific Surface Area of Preliminary Negative Electrode Active Material Layer Before Pressing and Specific Surface Area of Finished Negative Electrode Active Material Layer after Pressing>

'Specific surface area' was determined by the BET method, particularly by using BELSORP-mino II available from BEL Japan Co. from nitrogen gas adsorption amount at a temperature (77° K) of liquid nitrogen.

<Determination of Degree of Orientation of Preliminary Negative Electrode Active Material Layer Before Pressing and Degree of Orientation of Finished Negative Electrode Active Material Layer after Pressing>

The degree of orientation (I004/I110) of a negative electrode is a peak intensity ratio (I004/I110) of (004) surface and (110) surface as determined by electrode state X-ray diffractometry, and the peak intensity ratio may be obtained by X-ray diffractometry. The electrode state X-ray diffractometry refers to X-ray diffractometry carried out after forming the composite particles into an electrode (negative electrode) state. The X-ray diffractometry was carried out by using X-ray diffractometer, Bruker $D_4$ Endeavor, with Cu-Kα rays, and the measured values was corrected through Topas3 fitting program.

<Discharge Capacity Test>

Each of the pouch-type secondary batteries according to Example 1 and Comparative Examples 1-9 was determined for charge capacity and discharge capacity during charge/discharge with a charge cutoff voltage of 4.4 V at a rate of 0.5 C and a discharge cutoff voltage of 3.3 V at a rate of 0.5 C. The results are shown in the following Table 1.

<Room-Temperature Cycle Performance Test>

Each of the pouch-type secondary batteries according to Example 1 and Comparative Examples 1-9 was charged/discharged for 500 cycles at a temperature of 25° C. with a charge cutoff voltage of 4.4 V at a rate of 0.5 C and a discharge cutoff voltage of 3.3 V at a rate of 0.5 C. The ratio of the discharge capacity at the first cycle based on the discharge capacity of the last cycle was calculated as room temperature cycle performance (%). The results are shown in the following Table 1.

<Hybrid Pulse Power Characterization (HPPC) Output Performance Resistance Increment>

Each of the pouch-type secondary batteries according to Example 1 and Comparative Examples 1-9 was charged/discharge for 3 cycles at 0.1 C to check the battery capacity, and then charged/discharged at 2.5 C and a state-of-charge (SOC) of 50 to determine HPPC resistance by using pulse voltage.

Referring to Table 1, in the case of the secondary battery of Example 1 including the negative electrode obtained by the method according to the present disclosure, the difference in specific surface area between the preliminary negative electrode active material layer before pressing and the finished negative electrode active material layer after pressing is 0.5-1/0 m²/g, the difference in particle size of low-expansion natural graphite between $D_{90}$ and $D_{10}$ is 10 μm or less, and the total pore volume of low-expansion natural graphite is 10-20 cm³/g. As compared to Comparative Examples 1-9 not satisfying the above-mentioned conditions, the secondary battery according to Example 1 shows excellent characteristics in terms of discharge capacity, room-temperature cycle performance and resistance increment.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A method for manufacturing a negative electrode, comprising the steps of:
    preparing a negative electrode slurry comprising low-expansion natural graphite, a binder polymer, a conductive material and a dispersion medium;
    applying the negative electrode slurry to at least one surface of a negative electrode current collector, and drying the applied negative electrode slurry, to form a preliminary negative electrode having a preliminary negative electrode active material layer; and
    pressing the preliminary negative electrode to obtain the negative electrode having a finished negative electrode active material layer,
    wherein a difference between a specific surface area of the preliminary negative electrode active material layer

TABLE 1

|  | Ex. 1 | Comp. Ex. 1 | Comp. Ex. 2 | Comp Ex. 3 | Comp. Ex. 4 | Comp Ex. 5 | Comp Ex. 6 | Comp. Ex. 7 | Comp. Ex. 8 | Comp. Ex. 9 |
|---|---|---|---|---|---|---|---|---|---|---|
| Particle size of low-expansion natural graphite $D_{90} - D_{10}$ (μm) | 8 | 11 | 12 | 14 | 17 | 21 | 27 | 24 | 26 | 22 |
| Total pore volume of low-expansion natural graphite (cm³/g) | 15 | 21 | 24 | 28 | 31 | 27 | 26 | 28 | 31 | 34 |
| Difference in specific surface area between preliminary negative electrode active material layer before pressing and finished negative electrode active material layer after pressing (m²/g) | 0.8 | 1.0 | 1.1 | 1.4 | 1.7 | 1.8 | 2.0 | 2.1 | 2.5 | 2.8 |
| Difference in degree of orientation | 6 | 10 | 12 | 15 | 16 | 12 | 13 | 15 | 11 | 9 |
| Discharge capacity (mAh) | 2340 | 2270 | 2270 | 2270 | 2270 | 2270 | 2270 | 2270 | 2270 | 2270 |
| Room-temperature cycle performance (%) | 95 | 90 | 88 | 89 | 87 | 83 | 84 | 85 | 82 | 80 |
| HPPC Output performance resistance increment (%) | 11 | 15 | 18 | 20 | 23 | 27 | 30 | 29 | 24 | 26 | before pressing and that of the finished negative electrode active material layer after pressing is 0.5 m²/g to 1.0 m²/g,
wherein the low-expansion natural graphite has a difference in particle size between $D_{90}$ and $D_{10}$ of 10 μm or less, wherein $D_{90}$ is a particle diameter at a point of 90% in the particle size cumulative distribution as a function of particle diameter in a laser diffraction particle size analyzer, and $D_{10}$ is a particle diameter at a point of 10% in the particle size cumulative distribution as a function of particle diameter in the laser diffraction particle size analyzer, and
wherein the low-expansion natural graphite has a total pore volume of 10 cm³/g to 20 cm³/g.

2. The method for manufacturing the negative electrode according to claim 1, wherein the difference between the specific surface area of the preliminary negative electrode active material layer before pressing and that of the finished negative electrode active material layer after pressing is 0.6 m²/g to 0.9 m²/g.

3. The method for manufacturing the negative electrode according to claim 1, wherein the low-expansion natural graphite has a difference in particle size between $D_{90}$ and $D_{10}$ of 5 μm to 10 μm.

4. The method for manufacturing the negative electrode according to claim 1, wherein the low-expansion natural graphite has a total pore volume of 12 cm³/g to 18 cm³/g.

5. The method for manufacturing the negative electrode according to claim 1, wherein the difference of I004/I110 in degree of orientation between the preliminary negative electrode active material layer before pressing and the finished negative electrode active material layer after pressing is 4 to 8.

6. The method for manufacturing the negative electrode according to claim 5, wherein the difference of I004/I110 in degree of orientation between the preliminary negative electrode active material layer before pressing and the finished negative electrode active material layer after pressing is 5 to 7.

7. A negative electrode obtained by the method as defined in claim 1.

8. A secondary battery, comprising:
the negative electrode as defined in claim 7;
a positive electrode; and
a separator interposed between the negative electrode and the positive electrode.

9. The secondary battery according to claim 8, wherein the positive electrode comprises a lithium cobalt oxide.

10. The secondary battery according to claim 8, which is a pouch-type secondary battery.

* * * * *